United States Patent
Wang et al.

(10) Patent No.: US 10,976,114 B2
(45) Date of Patent: Apr. 13, 2021

(54) HEAT STORAGE UNIT

(71) Applicant: XI'AN JIAOTONG UNIVERSITY, Xi'an (CN)

(72) Inventors: Qiuwang Wang, Xi'an (CN); Yuchen Pu, Xi'an (CN); Zuowei Wang, Xi'an (CN); Ziliang Zhu, Xi'an (CN); Zhuo Zhang, Xi'an (CN); Lei Zhu, Xi'an (CN); Mengwei Zhang, Xi'an (CN); Ting Ma, Xi'an (CN); Xinyi Li, Xi'an (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 16/632,381

(22) PCT Filed: Aug. 2, 2017

(86) PCT No.: PCT/CN2017/095534
§ 371 (c)(1),
(2) Date: Jun. 4, 2020

(87) PCT Pub. No.: WO2019/019204
PCT Pub. Date: Jan. 31, 2019

(65) Prior Publication Data
US 2020/0300557 A1    Sep. 24, 2020

(30) Foreign Application Priority Data
Jul. 26, 2017 (CN) .......................... 201710615461.3

(51) Int. Cl.
*F28D 17/00* (2006.01)
*F28D 20/02* (2006.01)

(52) U.S. Cl.
CPC .................................. *F28D 20/02* (2013.01)

(58) Field of Classification Search
CPC ....................................................... F28D 20/02
(Continued)

(56) References Cited

U.S. PATENT DOCUMENTS

2009/0107651 A1    4/2009  Meuzelaar
2013/0014916 A1*   1/2013  Wadley .................. E01C 11/26
                                                            165/104.21

FOREIGN PATENT DOCUMENTS

CN    102777874 A    11/2012
CN    104140786 A    11/2014
(Continued)

*Primary Examiner* — Davis D Hwu

(57) ABSTRACT

A heat storage unit, at least comprises one single-layer closed case (2) that has at least one heat exchange surface (8, 9) and a non-heat exchange surface; the internal space of the closed housing (2) is filled with a foam skeleton (4); the phase change medium (6) is homogeneous distributed in the voids of the foam skeleton (4), and forms a composite material (02) together with the foam skeleton (4), the composite material has a higher thermal conductivity coefficient than that of the pure phase transition medium (6); vibration particles (3) are made of shape memory alloy, pressed into strips and then filled into the voids of the foam copper frame (4) by filtration; the ultrasonic generator (05) emits ultrasonic to induce the vibration particles (3) to generate vibration, the vibration converts the liquid phase transition medium (6) from natural convection or pure heat conduction to forced convection.

12 Claims, 2 Drawing Sheets

(58) Field of Classification Search
USPC .......................................................... 165/10
See application file for complete search history.

(56) References Cited

FOREIGN PATENT DOCUMENTS

DE      10343151 A1     4/2005
JP        3076847 B1     6/2000

\* cited by examiner

HEAT STORAGE UNIT

CROSS REFERENCES TO RELATED APPLICATIONS

This is a Sect. 371 National Stage of a PCT International Application No. PCT/CN2017/095534, filed on Aug. 2, 2017, which claims priority to a Chinese Patent Application No. CN2017106154613, entitled "Heat Storage Unit", filed with CNIPO on Jul. 26, 2017, the contents of which are incorporated herein by reference in its entirety.

TECHNICAL FIELD

The present disclosure relates to an efficient heat storage unit and a heat exchanger with the efficient heat storage unit.

BACKGROUND

Current heat storage devices can be divided into two types: sensible heat type and phase change latent heat type. Solid-liquid phase change latent heat type storage unit has become the main phase change heat storage unit due to its high heat storage density and stable temperature control. The phase change thermal process is dominated by thermally conductive and convective heat transfer. Therefore the thermally conductive and convective property of phase change materials is very important. The common phase change materials have extremely low thermal conductivity, which greatly limits the heat storage efficiency of the heat storage unit. According to Chinese Patent application CN104140786A, by adding nanoparticles and highly thermally conductive porous materials into the phase change material, the effective thermal conductivity coefficient is improved by 40-50%. However, the effect of this method on the heat transfer enhancement is not obvious, and the heat transfer efficiency per unit volume has not been greatly improved.

Chinese Patent CN102777874A disclosed an improved structure of a core component of a heat storage unit applied to a phase change heat storage unit. In this structure, paraffin wax is filled into a foam graphite skeleton. This design can greatly improve the heat transfer performance of the heat storage unit, and the equivalent thermal conductivity reaches 135 W/(m·K). Although this heat storage unit has good performance, the foam graphite is expensive and needs to be connected with the heat-absorbent surface of the heat storage unit by vacuum silver soldering, which results in extremely high cost and difficulty for mass production. As a result, it is only applied to special fields such as the military industry or aerospace.

Japanese Patent JP3076847B1 disclosed an improved structure for a heat storage tank. A solid sheet, made of metal, ceramics, ores and the like, is encapsulated in the heat storage tank. Under the excitation of an ultrasonic, the solid sheet vibrates in the heat storage medium. This design can transform the liquid phase change material from natural convection to forced convection, which quickly transfer heat into the phase change domain.

SUMMARY

The present disclosure provides a heat storage unit with high thermal conductivity and high heat exchange efficiency to address the low heat transfer efficiency of phase change heat storage device and poor thermal conductivity of phase change material. This unit is used in heat exchange equipment, such as phase change heat storage devices that apply hot fluid, high temperature flame or radiation as the heat source. This unit significantly improves heat transfer performance and reduces manufacturing costs.

The present disclosure provides a heat storage unit. The heat storage unit includes at least a single-layer closed case. The closed case has at least one heat exchange surface; the internal space of the enclosure case is filled with a foam skeleton; the phase change medium is homogeneous distributed in the voids of the foam skeleton, and forms a composite material together with the foam skeleton; the composite material has a higher thermal conductivity than that of the pure phase change medium; vibration particles are made of the shape memory alloy, and are pressed into strips and then filled into the voids of the foam copper frame by filtration; the ultrasonic generator emits ultrasonic to induce the vibration particles to generate vibration, the vibration converts the liquid phase transition medium from natural convection or pure heat conduction to forced convection, the ultrasonic generator improves the convective surface heat transfer coefficient of the liquid phase change medium by the cavitation and acoustic flow effects of ultrasonic.

The preferred embodiment further includes any one of the following technical features.

The heat exchange surface and the non-heat exchange surface of the single-layer closed case are made of the same metal or non-metal material, and the non-heat exchange surface is wrapped by heat insulation material; or the heat exchange surface and the non-heat exchange surface of the single-layer closed case are made of different materials, the thermal conductivity of the surface material is higher than that of the non-heat exchange surface material.

The foam skeleton is made of a material with the high thermal conductivity. For example, the foam skeleton can be made of the metal (foam copper skeleton or foam aluminum skeleton) or the non-metal material (foam graphite skeleton) or can also be made of the network structure with the high thermal conductivity material (copper wire, stainless steel wire).

The phase change medium is made of the material that can undergo phase change at a certain temperature range and at least one phase is a liquid phase, and absorbs or releases latent heat during the phase change.

The cold shape of the vibration particles is branch-shaped, ring-shaped, arc-shaped, or cross-shaped, the vibration particles are pressed into strips at room temperature, and added into the foam skeleton by filtration, the strip vibration particles are heated and then cooled down, due to high-temperature deformation, the strip vibration particles restore the cold shape, and get stuck in the foam skeleton so that the vibration particles is stable, and is prevented from falling out of the foam skeleton.

The vibration of the vibration particles is provided by an external ultrasonic, an alternating electromagnetic field or a motor instead of the ultrasonic generation device. The vibration of the vibration particles can also be provided by the vibration particles themselves.

The ultrasonic generation device is an ultrasonic generator that consumes electric energy or is a self-powered thermoacoustic conversion device.

The ultrasonic generator consuming electric energy converts industrial frequency AC power to high-frequency AC power, and then convert high-frequency AC power into ultrasonic with the same frequency by using an ultrasonic transducer. A self-powered thermoacoustic conversion device generates ultrasonic by acoustic self-excited oscillation in an elastic medium (usually a high-pressure inert gas) caused by heat.

The heat exchange surface includes fins or is surface treated.

The present disclosure also provides a phase transition heat storage device using the heat storage device.

The present disclosure further provides a heat storage unit using ultrasonic to excite particle resonance to enhance phase change heat transfer. The heat storage unit includes three methods for enhancing: improving the effective thermal conductivity of the phase change medium by using the foam copper skeleton with high thermal conductivity; increasing the convective heat transfer coefficient of liquid paraffin and solid paraffin by using cavitation and acoustic flow effects of ultrasonic; enhancing acoustic flow by using ultrasonic to excite vibrations of small particles of shape memory alloys, and then converting natural convection or pure heat conduction of liquid paraffin into forced convection, thereby increasing the surface heat transfer coefficient.

The foam copper skeleton forms a composite material together with paraffin homogeneous distributed in the foam copper skeleton, to improve the thermal conductivity. The nickel-titanium shape memory alloy with cross-shaped particles are pressed into line-shaped segments and then added to the foam copper skeleton by filtration. The shape memory alloy in the foam copper skeleton is restored to cross-shaped due to its deformation ability and fixed inside the foam copper skeleton. The small particles of shape memory alloy excited to vibrate by the ultrasonic. The heat exchange efficiency of the cold/hot fluid heat exchange channel may be improved by the fins, surface treatment, and flow channel design.

The shape of the memory alloy can change at different temperatures, so that the vibration particles can be easily filled into the foam skeleton, and it is difficult for the vibration particles to fall out during working process, thus making the heat storage unit stable.

The heat working medium and the cooling working medium flow through the cold/hot fluid heat exchange channel, which exchange heat with the heat exchange surface, and transfer heat to the foam copper skeleton and the paraffin compound, under the resonance of small particles of shape memory alloy. The liquid paraffin in the forced convection state absorbs heat through convective heat transfer.

According to the present disclosure, the heat storage unit with enhanced phase change heat exchange by using ultrasonic excited particle resonance includes the stainless steel case, the foam copper skeleton, the shape memory alloy small vibration particles, and the phase change material composite. The foam copper skeleton and paraffin form a composite material with high thermal conductivity. Ultrasonic converted by ultrasonic transducers enters the phase change material after passing through the conductive steel plate. The convective surface heat transfer coefficient of liquid paraffin is improved by the cavitation and acoustic flow effects of ultrasonic. The small particles of the shape memory alloys vibrate to produce an enhanced acoustic flow effect and the liquid paraffin is converted from natural convection or pure heat conduction to forced convection, thereby further improving the surface heat transfer coefficient.

Compared with the heat storage unit only using phase-change composites material to enhance heat exchange, the heat exchange efficiency per unit volume of the present disclosure is increased 20% by simply using ultrasonic. In the case of adding shape memory alloys particles, the heat exchange efficiency per unit volume of the present disclosure is increased by 1.2 times than the former due to the vibration of the particles.

Compared with the conventional metal mesh skeleton heat storage unit, the present disclosure increases the heat exchange efficiency per unit volume to more than 2.6 times with a cost increase of only 2%. Compared with the foam graphite skeleton heat storage unit, the heat exchange efficiency of the same volume of the present disclosure can be maintained at 82% of the heat storage efficiency of such type of heat storage device, while the cost is only 13%. The present disclosure solves the contradiction between heat exchange effect and cost and has a less compact structure and broader application.

Figure 1:
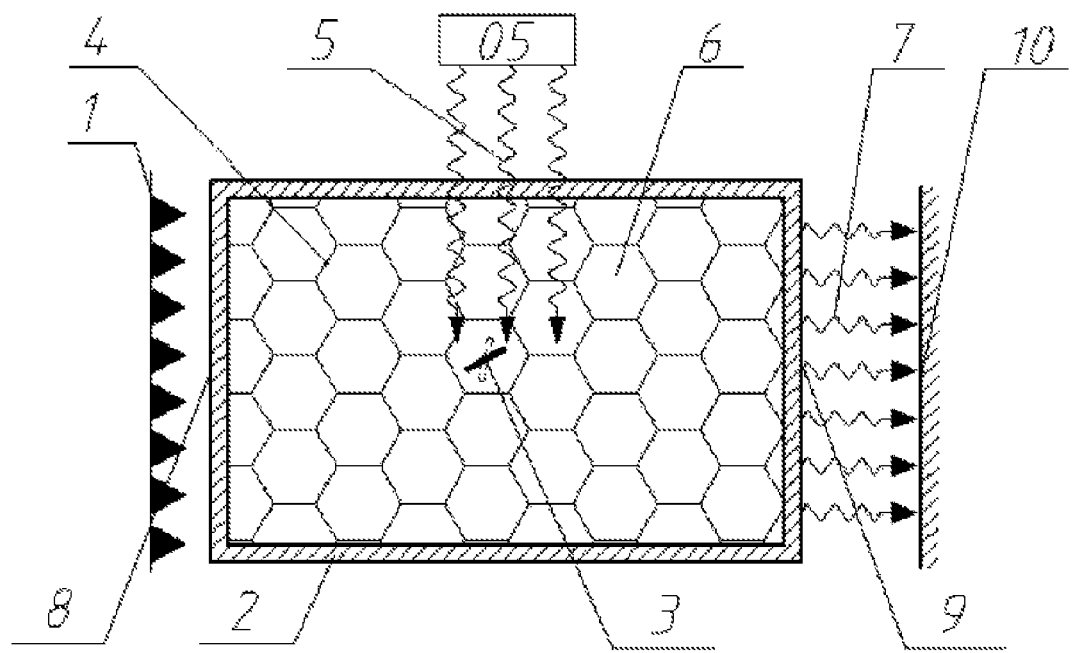
FIG. 1 is the schematic diagram of the present disclosure.

The reference numerals in FIG. 1:
1. heat source; 2. case; 3. vibration particle; 4. foam skeleton; 5. vibration source; 6. phase change medium; 7. cold source; 8. heat-absorbent surface; 9. heat-delivery surface 10. environment; 05. ultrasonic generator.

Figure 2:
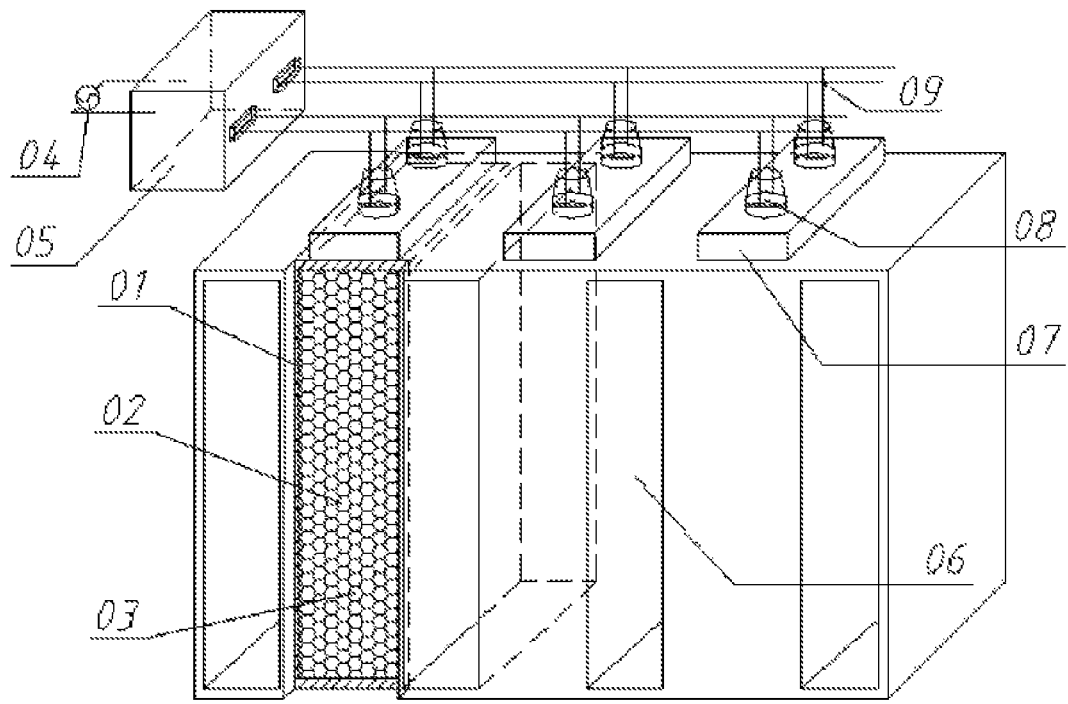
FIG. 2 is the schematic diagram of the heat storage unit using ultrasonic to excite particle resonance for enhancing phase transition heat.

The reference numerals in FIG. 2:
01. stainless steel housing; 02. foam copper skeleton and paraffin compound; 03. shape memory alloy vibration particle; 04. industrial frequency AC power supply; 05. ultrasonic generator; 06. cold/hot fluid heat exchange channel; 07. ultrasonic conductive steel plate; 08. ultrasonic transducer; 09. high-frequency AC power supply line.

Figure 3:
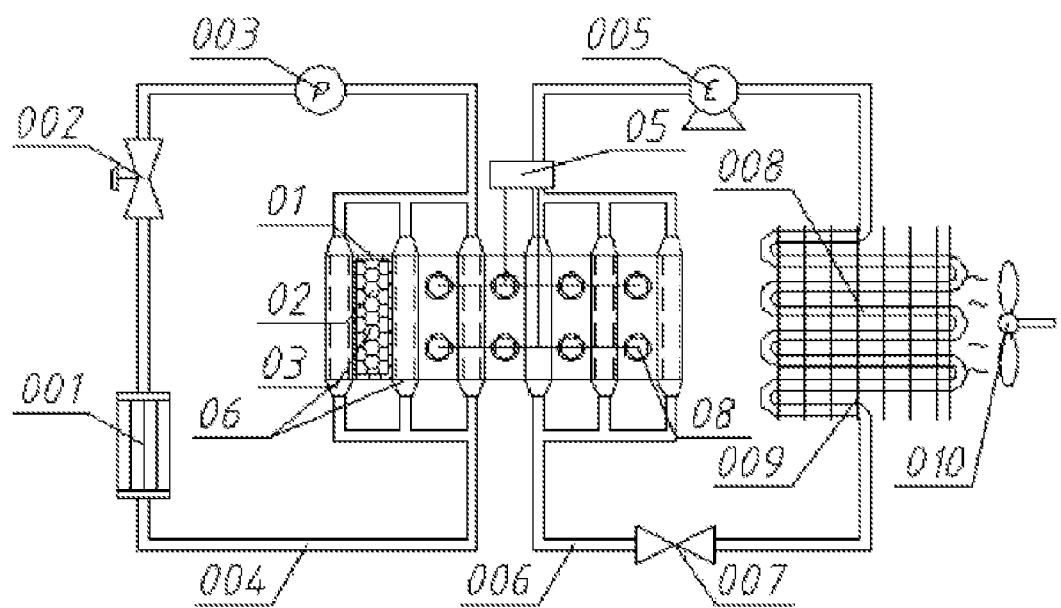
FIG. 3 is a schematic diagram of the system of a preferred embodiment for the present disclosure.

The reference numerals in FIG. 3:
001. high power fiber laser; 002. solenoid valve; 003. fluid pump; 004. hot fluid flow pipeline; 01. stainless steel housing; 02. foam copper skeleton and paraffin compound; 03. shape memory alloy vibration particle; 05. ultrasonic generation device; 06. cold/hot fluid heat exchange channel; 08. ultrasonic transducer; 005. compressor; 006, cooling fluid flow pipeline; 007. throttle valve; 008. condenser; 009. radiation fin; 010. cooling fan.

DETAILED DESCRIPTION OF THE PREFERRED EMBODIMENTS

The heat storage unit provided by the present disclosure is shown in FIG. 1.

The heat storage unit includes a single-layer closed case. The internal space of the housing 2 is filled with the foam skeleton 4. The foam skeleton 4 has a high thermal conductivity. A phase change medium 6 is filled in the foam skeleton 4. The phase transition medium 6 has a phase transition at a certain temperature range, and at least one phase is in liquid phase. During the phase transition process, the latent heat is absorbed or released. The vibration particles 3 exist in the space of the foam skeleton 4 and are in close contact with the phase transition medium 6. The heat is transferred into the interior of the heat storage housing through the heat-absorbent surface 8 and the connected foam skeleton 4. The particles are vibrated under the inducing of the external or internal vibration source 5. The vibration of the particles causes the liquid medium to transform from natural convection (when the heat storage unit is in the weightlessness of space, it is purely thermally conductive) into forced convection. The heat is transferred into the interior of the phase transition medium 6. The cold source 7 transfers the heat out of the heat storage unit into the environment 10 through the heat-delivery surface 9 and the foam skeleton connected to the heat-delivery surface 9.

A phase transition heat storage unit using the heat storage unit of the present disclosure is shown in FIG. 2.

The heat storage unit enhanced by ultrasonic-excited particle resonance includes a stainless steel housing 01, a foam copper skeleton and a phase transition medium composite 02, shape memory alloy vibration particles 03, industrial frequency AC power supply 04, and an ultrasonic generator 05, cold/hot fluid heat exchange channel 06, ultrasonic conductive steel plate 07, ultrasonic transducer 08, and high-frequency AC power supply line 09.

The stainless steel housing 01 has a cuboid structure, which is covered with thermal insulation foam. The phase transition medium is homogeneous distributed in the space within the foam copper skeleton, thereby forming a composite material 02 together with the copper skeleton to improve thermal conductivity. Shape memory alloy vibration particles 3 are made of nickel-titanium shape memory alloy. The cold shape of shape memory alloy vibration particles 3 is cruciform. After being pressed into segments, the shape memory alloy vibration particles 3 is added to the foam copper skeleton and phase transition medium composite 02 by filtration. The shape memory alloy vibration particles 3 reinstate to cruciform after heat treatment and are fixed inside the foam copper skeleton and phase transition medium composite 02.

The iron-based shape memory alloy particles are made of ferromagnetic material and are easily magnetized. Under the influence of an alternating electromagnetic field, the magnetized shape memory alloy particles vibrate with the change of the magnetic field direction. The motor connected to the eccentric wheel generates mechanical vibrations which cause the vibration of the entire heat storage unit, thereby stimulating the vibration of the shape memory alloy particles inside the heat storage unit. The shape memory alloy is made into a hollow tube, and the interior of the tube is filled with high-pressure inert gas. When the particles are heated, the gas expands and generates a first pressure disturbance wavefront, which propagates to both ends at the speed of sound. The gas contracts in volume after heat exchange at both ends, and the contracted gas tends to move back. Meanwhile, the first pressure wavefront propagates to the end of the cavity resonator and is reflected. The reflected wave is superimposed with the contraction of the gas. Positive feedback enhancement occurs at a certain frequency. After repeating enhancement for several cycles, the enhancement reaches saturation and a continuous resonance wave is formed, and the particles vibrate by themselves.

The industrial frequency AC power supply 04 supplies power to the ultrasonic generation device 05. The ultrasonic generation device 05 includes a leakage protection device. The industrial frequency AC power supply 04 generates high-frequency AC power and supplies power to the ultrasonic transducer 08 through the high-frequency AC power supply line 09. The ultrasonic transducer 08 converts high-frequency AC power provided by the high-frequency AC power supply line 09 to ultrasonic with the same frequency. The thickness of the ultrasonic conductive steel plate 07 is 3 to 5 mm. The ultrasonic conductive steel plate 07 includes bolts installed by argon arc welding. The ultrasonic conductive steel plate 07 tightly sticks to the ultrasonic transducer 08 by utilizing a special glue for the ultrasonic transducer. The ultrasonic transducer 08 converts electrical signals to ultrasonic. The ultrasonic is transmitted into the interior of the heat storage unit via the ultrasonic conductive steel plate 07, to excite the shape memory alloy vibration particles 03, thereby agitating the liquid paraffin to strengthen heat exchange.

The heat-collecting working medium and the cooling working medium flowing through the cold/hot fluid heat-exchanging channel exchange heat with the heat-exchanging surface and are transferred to the foam copper skeleton and the paraffin compound. The heat-exchanging surface has fins. The liquid paraffin in the state of forced convection under the resonance of small particles of shape memory alloy absorbs heat through convection heat transfer.

A preferred embodiment of the present disclosure is described in conjunction with FIG. 3. The core component is the above heat storage device.

The high-power fiber laser 001 generates heat during operation. The heat is transferred to the heat-collecting working medium in the hot fluid flow pipeline 004, to keep the constant temperature of the high-power fiber laser 001. After pressurized by the fluid pump 003, the hot fluid circulates in the hot fluid flow pipeline 004. The solenoid valve 002 adjusts the flow of the hot fluid according to the power of the high power fiber laser 001.

The heat-collecting working medium in the hot fluid heat exchange channel 06 on the left side exchanges heat with the heat exchange surface with fins and are transferred to the foam copper skeleton and the paraffin compound. The solid paraffin close to the foam copper framework is transited to liquid paraffin. The ultrasonic generation device 05 generates high-frequency alternating current. The ultrasonic transducer 08 converts the high-frequency alternating current into ultrasonic with the same frequency. The ultrasonic is transmitted into the interior of heat storage unit via the ultrasonic conductive steel plate to cause the shape memory alloy vibration particles 03 to vibrate and agitate the liquid paraffin, so that the liquid paraffin changes from natural convection (when the heat storage unit is in the weightlessness of space, it is purely thermally conductive) to forced convection. The heat is transferred to the solid paraffin from the liquid paraffin through convection, and the heat generated by the high-power fiber laser 001 is quickly converted into liquid latent heat of paraffin and stored in the heat storage unit.

After the operation of the high-power fiber laser 001 is completed, the ultrasonic generation device 05 is turned off, and ultrasonic are no longer generated. The cooling working medium is a low-boiling-point substance, which flows through the cooling fluid flow pipeline 006. The heat is transferred from the liquid paraffin to the cooling working medium in the hot fluid heat exchange channel 06 on the left side through the foam copper skeleton, which is equivalent to an evaporator. The cooling working medium absorbs heat from the evaporator under constant pressure, vaporizes into dry saturated steam, and then enters the compressor 005 to be compressed in an adiabatic state. The temperature exceeds the ambient temperature. After that, the cooling working medium enters the condenser 008, and isobaric dissipates the heat to the environment medium through the surface fins 009. A cooling fan 010 is used to enhance the air flow. The liquid paraffin in the heat storage unit is concreted and returns to the original solid state. In condenser 008, the superheated cooling working medium is isobarically cooled down to the saturation temperature corresponding to the current pressure and then isobarically condensed into a saturated liquid state (and is isothermal). Then the cooling working medium enters the throttle valve 007, which is cooled down and depressurized in heat insulation condition to wet saturated steam state corresponding to the initial pressure of the cycle. At last, the cooling working medium enters the evaporator to complete the cycle.

The above description is only an embodiment of the present disclosure, which is not intended to limit the scope of the present invention. Every equivalent structure or equivalent process transformation made by using the description of the present disclosure and the contents of the drawings, or directly or indirectly used in other related technical fields are included in the scope of protection of the present disclosure.

INDUSTRIAL PRACTICABILITY

The heat storage unit of the present disclosure can be manufactured or used in industry, thus has industrial practicability.

The invention claimed is:

1. A heat storage unit includes at least a single-layer closed case, wherein
   the closed case (2) has at least one heat exchange surface (8, 9) and one non-heat exchange surface;
   a foam skeleton (4) is filled in the internal space of the closed housing (2);
   the phase change medium (6) is homogeneous distributed in the voids of the foam skeleton (4), and forms a composite material (02) together with the foam skeleton (4), the composite material has a higher thermal conductivity coefficient than that of the pure phase change medium (6);
   vibration particles (3) are made of shape memory alloy, pressed into strips and then filled into the voids of the foam skeleton (4) by filtration;
   the ultrasonic generator (05) emits ultrasonic to induce the vibration particles (3) to generate vibration, the vibration converts the liquid phase change medium (6) from natural convection or pure heat conduction to forced convection;
   the ultrasonic generator (05) improves the convective heat transfer coefficient of the liquid phase change medium (6) by using the cavitation and acoustic flow effects of ultrasonic.

2. The heat storage unit according to claim 1, wherein the heat exchange surface (8, 9) and the non-heat exchange surface of the single-layer closed case (2) are made of the same metal or non-metal material, and the non-heat exchange surface is wrapped by heat insulation material.

3. The heat storage unit according to claim 1, wherein the heat exchange surface (8, 9) and the non-heat exchange surface of the single-layer closed case (2) are made of different materials, the thermal conductivity of the surface (8, 9) material is higher than that of the non-heat exchange surface material.

4. The heat storage unit according to claim 1, wherein the foam skeleton (4) is made of a metal or non-metal material.

5. The heat storage unit according to claim 1, wherein the foam skeleton (4) is a network structure.

6. The heat storage unit according to claim 1, wherein that the phase change medium is made of a material that undergoes phase change at a certain temperature and at least one phase is a liquid phase, and absorbs or releases latent heat during the phase change.

7. The heat storage unit according to claim 6, wherein the phase change medium (6) includes paraffin, molten salt, liquid metal, or an easily gasified organic material.

8. The heat storage unit according to claim 1, wherein the cold shape of the vibration particles (3) is branch-shaped, ring-shaped, arc-shaped, or cross-shaped, the vibration particles (3) are pressed into strips at room temperature, and added into the foam skeleton (4) by filtration, when the strip vibration particles (3) are heated and then cooled down, due to high temperature deformation, the strip vibration particles (3) restore the cold shape, and get stuck in the foam skeleton (4), so that the vibration particles (3) is stable and prevented from falling out of the foam skeleton (4).

9. The heat storage unit according to claim 1, wherein the vibration of the vibration particles (3) is provided by an external ultrasonic, an alternating electromagnetic field or a motor instead of the ultrasonic generation device (05), the vibration of the vibration particles (3) is provided by the vibration particles (3) themselves.

10. The heat storage unit according to claim 1, wherein the ultrasonic generation device (05) is an ultrasonic generator that consumes electrical energy or a self-powered thermoacoustic conversion device.

11. The heat storage unit according to claim 1, wherein the heat exchange surface (8, 9) includes fins or is surface treated.

12. A heat exchanger, comprising a heat storage unit, the heat storage unit at least includes a single-layer closed housing, wherein
    the closed housing (2) having at least one heat exchange surface (8, 9) and a non-heat exchange surface;
    a foam skeleton (4) is filled in the internal space of the closed housing (2);
    the phase transition medium (6) is evenly distributed in the voids of the foam skeleton (4), and forms a composite material (02) together with the foam skeleton (4), the composite material has a higher thermal conductivity coefficient than that of the pure phase transition medium (6);
    vibration particles (3) are made of shape memory alloy, pressed into strips and then filled into the voids of the foam skeleton (4) by filtration;
    the ultrasonic generator (05) emits ultrasonic to induce the vibration particles (3) to generate vibration, the vibration converts the liquid phase transition medium (6) from natural convection or pure heat conduction to forced convection;
    the ultrasonic generator (05) improve the convective surface heat transfer coefficient of the liquid phase transition medium (6) by using the cavitation and acoustic flow effects of ultrasonic.

* * * * *